United States Patent [19]

Bealkowski et al.

[11] Patent Number: 5,193,161
[45] Date of Patent: *Mar. 9, 1993

[54] COMPUTER SYSTEM HAVING MODE INDEPENDENT ADDRESSING

[75] Inventors: Richard Bealkowski, Delray Beach; Richard A. Dayan; David J. Doria; Scott G. Kinnear; Jeffrey I. Krantz, all of Boca Raton, Fla.; Robert B. Liverman, Raleigh, N.C.; Guy G. Sotomayor, West Palm Beach, Fla.; Donald D. Williams; Gary A. Vaiskauckas, both of Boca Raton, Fla.

[73] Assignee: International Business Machines Corp., Armonk, N.Y.

[*] Notice: The portion of the term of this patent subsequent to May 22, 2007 has been disclaimed.

[21] Appl. No.: 525,792

[22] Filed: May 18, 1990

Related U.S. Application Data

[63] Continuation of Ser. No. 30,789, Mar. 27, 1987, Pat. No. 4,928,237.

[51] Int. Cl.⁵ .................. G06F 12/00; G06F 9/445
[52] U.S. Cl. ............................ 395/400; 395/425; 395/700
[58] Field of Search ............ 395/400, 425, 700; 364/200 MS File, 900 MS File

[56] References Cited

U.S. PATENT DOCUMENTS

| | | | |
|---|---|---|---|
| 4,004,278 | 1/1977 | Nagashima | 364/200 |
| 4,084,224 | 4/1978 | Appell et al. | |
| 4,128,875 | 12/1978 | Thurber et al. | 364/200 |
| 4,270,167 | 5/1981 | Koehler et al. | 364/200 |
| 4,296,468 | 10/1981 | Bandoh et al. | 364/200 |
| 4,315,321 | 2/1982 | Parks, III et al. | 364/200 |
| 4,325,120 | 4/1982 | Colley et al. | 364/200 |
| 4,442,484 | 4/1984 | Childs, Jr. et al. | 364/200 |
| 4,514,805 | 4/1985 | McDonough et al. | 364/200 |
| 4,727,480 | 2/1988 | Albright et al. | 364/200 |
| 4,736,290 | 4/1988 | McCallion | 364/200 |
| 4,747,040 | 5/1988 | Blanset et al. | 364/200 |
| 4,779,187 | 10/1988 | Letwin | 364/200 |
| 4,787,032 | 11/1988 | Culley | 364/200 |
| 4,825,358 | 4/1989 | Letwin | 364/200 |
| 4,849,875 | 7/1989 | Fairman et al. | 364/200 |
| 4,928,237 | 5/1990 | Bealkowski et al. | 364/200 |
| 4,974,159 | 11/1990 | Hargrove et al. | 364/200 |
| 5,018,062 | 5/1991 | Culler et al. | 364/200 |
| 5,027,273 | 6/1991 | Letwin | 364/200 |

FOREIGN PATENT DOCUMENTS

0197552 10/1986 European Pat. Off.
0208429 1/1987 European Pat. Off.

OTHER PUBLICATIONS

A Process or Family for Personal Computers, Robert E. Childs, Jr. Proceedings of the IEEE, vol. 72, No. 3, Mar., 1984.
Intel iAPX 286 Operating Systems Writer's Guide, 1983, Intel Corp, Santa Clara, Calif.
Intel iAPX 286 Programmer's Reference Manual, 1983 Intel Corp., Santa Clara, Calif.

*Primary Examiner*—Stuart S. Levy
*Assistant Examiner*—Michael A. Whitfield
*Attorney, Agent, or Firm*—Winfield J. Brown, Jr.; Stephen A. Terrile

[57] ABSTRACT

A computer system and method for operating a computer system capable of running in mutually incompatible real and protected addressing modes, in which programs written for one mode can be run in the other mode without modification. The BIOS assembles two different common data areas for the two modes, each inclusive of device block pointers, function transfer table pointers, data pointers, and function pointers. The common data area for the real mode is assembled first. To assembly the pointers for the protected mode common data area, the offset values from the real mode area ae copied directly, and then selector values are inserted whose physical addresses correspond to the segments of the corresponding pointers in the real mode area. The selector values are derived from a segment descriptor table.

18 Claims, 6 Drawing Sheets

COMPUTER SYSTEM HAVING MODE INDEPENDENT ADDRESSING

This is a continuation of Ser. No. 07/030,789, filed Mar. 27, 1987, now U.S. Pat. No. 4,928,237.

TECHNICAL FIELD

The present invention relates to a computer system employing a processor having more than one addressing mode. More specifically, the invention pertains to such a computer system which is capable of running the same applications program in each of plural addressing modes.

BACKGROUND OF THE INVENTION

Microcomputers (personal computers) are being required to perform more and more complex data processing tasks while not suffering a degradation in response speed. On the other hand, in order to perform the more sophisticated tasks, additional device drivers, networking programs, host, attachment programs, session managing programs, etc., must be loaded into the available memory space. The amount of space left for the user's applications programs is thus shrinking, forcing undesirable trade-offs to be made among storage, performance, and function.

To remedy this problem, microprocessors have lately become available in which the amount of addressable memory has been greatly expanded. For example, for the Intel Corporation 8088/8086 microprocessor (hereinafter a microprocessor will be referred to for convenience as a "CPU"—central processing unit). the amount of addressable memory is about 1 MB (Mega-Bytes), while for the newer 80286 CPU, about 16 MB can be addressed.

The 80286, however, employs two different and mutually incompatible addressing modes. The first mode, termed the "real" mode, is exactly the same addressing mode employed in the 8088/8086 CPU, and hence programs written for a machine employing the 8088/8086 CPU, such as the vast array of software written for the IBM PC computer and compatibles, can be run in the real mode since the same BIOS (Basic Input-Output System) can be used directly. In the real mode, however, since the addressing mode is in fact the same as for the 8086/8088, the amount of addressable memory is still limited to about 1 MB.

The second mode, termed the "protected" mode, employs a different memory addressing scheme, and with this scheme can address up to about 16 MB of memory. However, because the addressing mode is indeed different, the earlier BIOS cannot be used successfully, and hence computers which have employed the 80286 CPU have not been able to simultaneously take advantage of the increased amount of available memory in the protected mode and run software written for the 8086/8088 CPU.

FIG. 1 shows a memory map of a typical microcomputer application employing an 80286 CPU and showing an example of how the memory may be organized. Memory addresses in the range of 0 KB (KiloBytes) to 40 KB are taken up by the BIOS (Basic Input-Output System) and OS (Operating System). the most famous examples being PC DOS and MS DOS marketed by Microsoft Corporation. The user is allocated the space from 40 KB to 640 KB in both the real and protected mode. The video buffers occupy 640 KB to 752 KB, and feature and planar ROMs (Read-Only Memories) 752 KB to 1 MB. This is all the memory that can be addressed in the real mode. In the protected mode though 15 MB of additional addressable memory space is available to the user.

To better understand the problem solved by the invention, the two addressing modes will now be described in more detail.

For a CPU using segment and offset registers for addressing physical memory can be addressed directly using 32-bit pointers. As shown in FIG. 2, each 32-bit pointer is composed of a 16-bit offset (bits 0 to 15) and a 16-bit segment (bits 16 to 31). The memory is divided into 64 KB segments, and each of the 16-bit segment values of the pointers corresponds directly to one of these 64 KB segments in memory. That is, pointer segment n, multiplied by $2^4$ (equivalently, shifted one place in hexadecimal), directly indicates the address of the first eight-bit byte of data in segment n of the memory, namely, the boundary between segments $n-1$ and n in physical memory. The offset, on the other hand, indicates a displacement from the boundary between segments $n-1$ and n.

In the real mode of the 80286 CPU as indicated by the diagram of FIG. 3, to obtain the 20-bit value which directly addresses a given byte location (operand address) in physical memory, the segment value is multiplied by $2^4$ and added to the offset value. This 20-bit address is applied directly to the memory as an address.

In the protected mode of the 80286, the BIOS does not use physical memory in the form of segments and offsets. Moreover, the memory is not divided up into 64 KB segments. Instead. "virtual" memory addressing is employed in which the addresses do not correspond directly to distinct locations in physical memory. To allow for more efficient use of the available memory space while still retaining relative ease of addressing, the memory is again divided into segments, but the segments may be of variable lengths. Generation of the actual physical addresses is done internally to the 80286 CPU, out of reach of the user and BIOS.

The protected addressing mode will be explained in more detail with reference to FIG. 4 of the drawings.

As in the case of the 8088/8086 and real mode, the BIOS addresses memory using a 32-bit pointer. In the protected mode, the lower 16 bits (bits 0 to 15) of the pointer are also referred to as an offset. Because its function is different than that of the segment in the 8088/8086 and real mode the upper 16-bit portion of the pointer is termed a "selector". Instead of merely multiplying it by $2^4$ and adding it to the offset, the selector is used as a pointer to a segment descriptor contained in a segment descriptor table, which is assembled in a predetermined area of the physical memory. Each segment descriptor contains a 24-bit value, which indicates the base address (lower boundary address) of the corresponding segment in physical memory. To obtain the actual address of a desired operand in physical memory, the 24-bit segment descriptor value retrieved by the selector is added to the offset.

Because the selectors employed in the protected mode thus have a function which is much different than and nonequivalent to that of the segments in the 8088/8086 and real mode, the BIOS designed for the 8088/8086 and real mode, which uses segments in addressing, cannot operate directly in the protected mode, making it impossible to run in the protected mode programs written to use the BIOS developed for the 8088/8086 and real mode. While such programs can of course be run on the 80286 CPU in the real mode, it is a disadvantage not to also be able to run them in the protected mode.

OBJECTS OF THE INVENTION

Accordingly, it is an object of the present invention to provide a computer system and a method for operating a computer system in which the above-discussed drawbacks have been eliminated.

More specifically, it is an object of the invention to provide a computer system and a method for operating a computer system in which a single BIOS is capable of supporting programs both in the protected mode and in the real mode.

SUMMARY OF THE INVENTION

In accordance with the above and other objects of the invention, there is provided a computer system and a method of operating a computer system having mutually incompatible first and second addressing mode wherein, for each addressing mode, a common data area table is assembled containing pointers used to initiate the various data transfer tasks and other basic input-/output operations which the operating system or applications programs may need. Each pointer in the common data area table for the first mode is equivalent in function to a respective one of the pointers in the common data area table for the second mode. However, the pointers in the two tables are assembled for their respective addressing modes.

In the case of real and protected modes as discussed above, the pointers for the real mode common data area are each composed of a segment and an offset, and those of the protected mode common data area are composed of selectors and offsets. The offsets of the pointers in the protected mode table which point to addresses external to the common data area are identical in value to those of corresponding pointers in the real mode table, while the selectors correspond in physical address to the segments of the corresponding pointers.

DETAILED DESCRIPTION OF THE PREFERRED EMBODIMENT OF THE INVENTION

Figure 1:
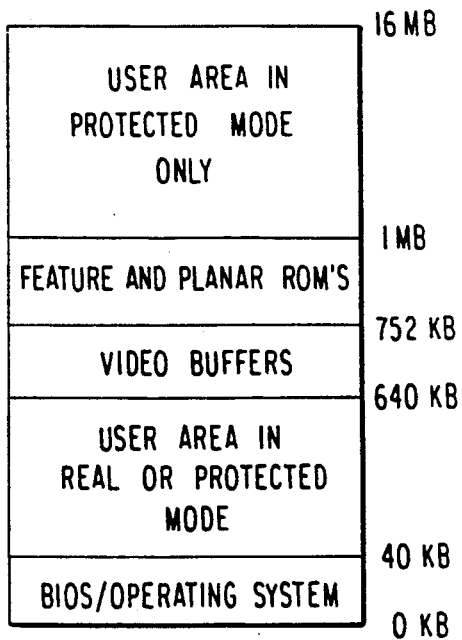
FIG. 1 is a memory map of an example of a computer system employing a CPU having real and protected addressing modes.
Figure 5:
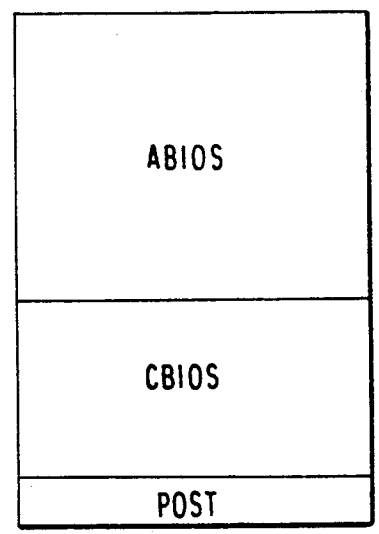
FIG. 5 is a diagram showing how the BIOS code is arranged in accordance with the present invention.
Figure 2:
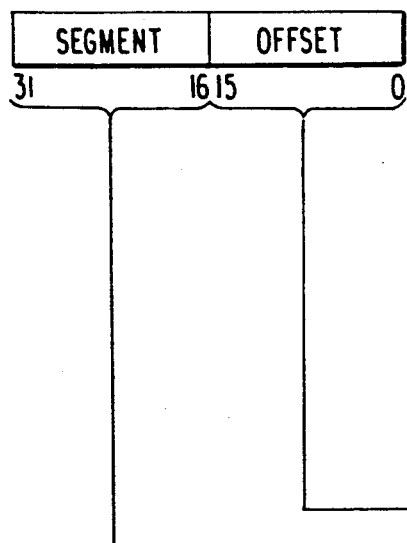
FIG. 2 shows a portion of a main memory in the real mode and illustrates how the memory is addressed using offsets and pointers.
Figure 2:
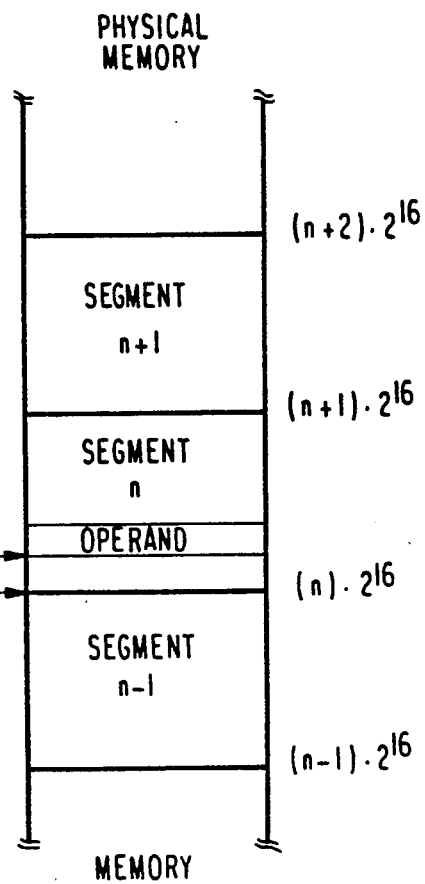
Figure 3:
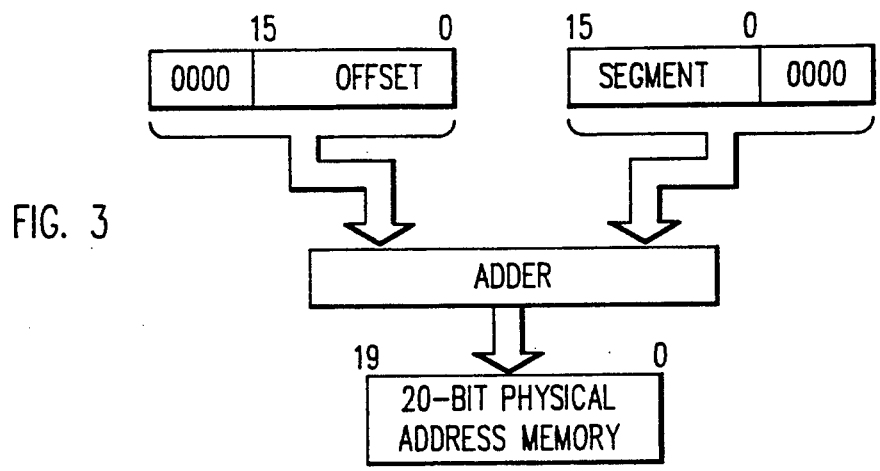
FIG. 3 depicts how segments and offset values are manipulated and added to produce physical memory addresses in the real mode.
Figure 4:
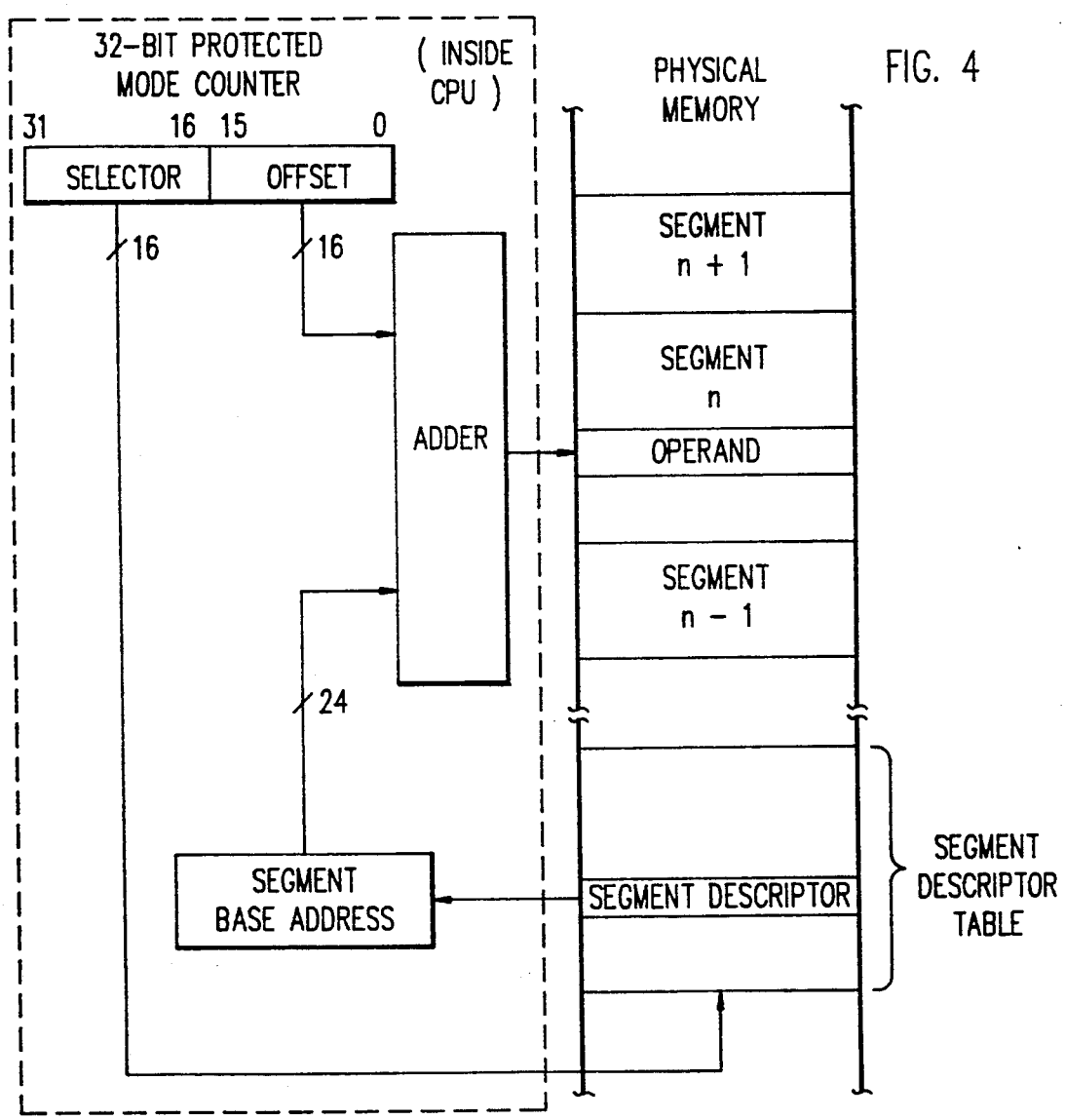
FIG. 4 shows a portion of a main memory in the protected mode and illustrates how the memory is addressed using offsets and pointers.

Referring first to the diagram of FIG. 5, there is shown therein a memory map for the BIOS code employed in the computer system of the invention.

The BIOS code is composed of three parts: POST, CBIOS and ABIOS. POST (Power-On Self Test) is used for performing initial self testing and other basic start-up functions, including extracting the boot record from the system disk and subsequent loading of the operating system into memory. CBIOS (Compatibility Basic Input-Output System) contains the BIOS used by applications programs for performing input-output operations (transfers of data to and from memory, peripherals, etc.) in the real mode only and in a single-tasking environment. ABIOS (Advanced Basic Input-Output System) contains the BIOS used by applications programs for performing input-output operations in a bimodal (i.e. effective in both real and protected modes), multi-tasking environment, as well as the BIOS routines used by the operating System for constructing tables required for the present bimodal addressing operations.

In accordance with the present invention, the ABIOS is given the capability of operating either in the real mode or the protected mode. The way in which this is done is for the ABIOS to assemble bimodal CDAs (Common Data Areas). one for the real mode and one for the protected mode. The entries contained in the two CDAs are identical in function, but in the real mode CDA the pointers are described in terms of segments and offsets, while in the protected mode CDA they are described in terms of selectors and offsets. If the operating system intends to execute BIOS only in the real mode, then only the real mode CDA need be assembled and used, whereby BIOS-controlled data transfers for applications programs take place in the previously known manner for operations in the real mode. Before the operating system can execute BIOS in the protected mode, however, the protected mode CDA must be assembled. By use of the protected mode CDA, which may be made to produce addresses identical to those produced via a corresponding section of the real mode CDA, programs initiated in one mode can be continued in the other mode, at the user's option and without requiring mode switching operations for continuation. Hence, by providing such CDAs for supporting corresponding addressing operations in both modes, the ABIOS code can be made to operate essentially "transparent" to the mode in which the user has selected to run the CPU. The result is mode-independent addressing for the applications programs.

Figure 6:
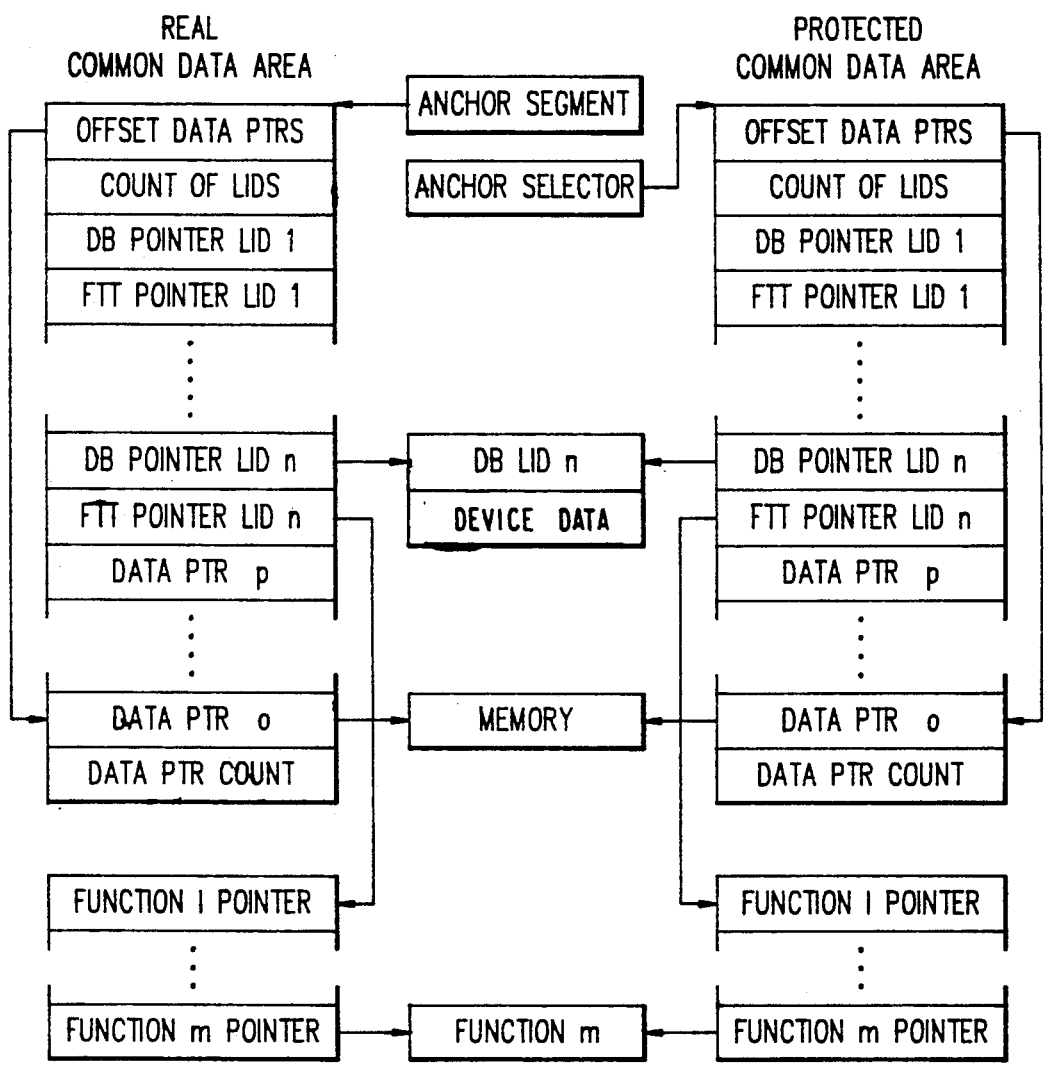
FIG. 6 is a map of a bimodal common data area in accordance with the invention.

An example of bimodal CDAs is shown in accompanying FIG. 6. The following abbreviations are used in FIG. 6 for simplicity:

LogicalID (LID)—Each LID corresponds to and identifies a requested device or device controller. Each device or device controller available to ABIOS has a LID associated therewith.

Device Block (DB)—The DB is a working storage area allocated by the operating system which contains hardware port addresses, interrupt levels, and device state information.

Function Transfer Table (FTT)—The FTT is a permanent storage area allocated by the operating system and which contains the pointers to each ABIOS function routine.

ABIOS Data Pointer (Data Ptr)—The data pointers supply the ABIOS with addressability to particular portions of memory in the bimodal environment. Examples are the pointers to the video buffers.

As can readily be appreciated from FIG. 6, in general, the entries in the two CDAs are entirely identical in function and in their place within the respective tables: the only difference is that the pointers in the real mode CDA are composed of segment and offset values, and the pointers in the protected mode CDA are composed of selectors and offsets. Thus, by merely employing the CDA corresponding to the present operating mode of the CPU. so far as the remainder of the BIOS. the operating system, and the applications programs are concerned, all BIOS operations are performed in the identical manner between the two modes. That is, as illustrated in FIG. 6, the corresponding DB pointer LID n in the two tables both point to the same DB LID n, the corresponding data pointer 0 in the two tables point to the same identical location in memory, and the same function m pointers point to the same identical function m.

Figure 7A:
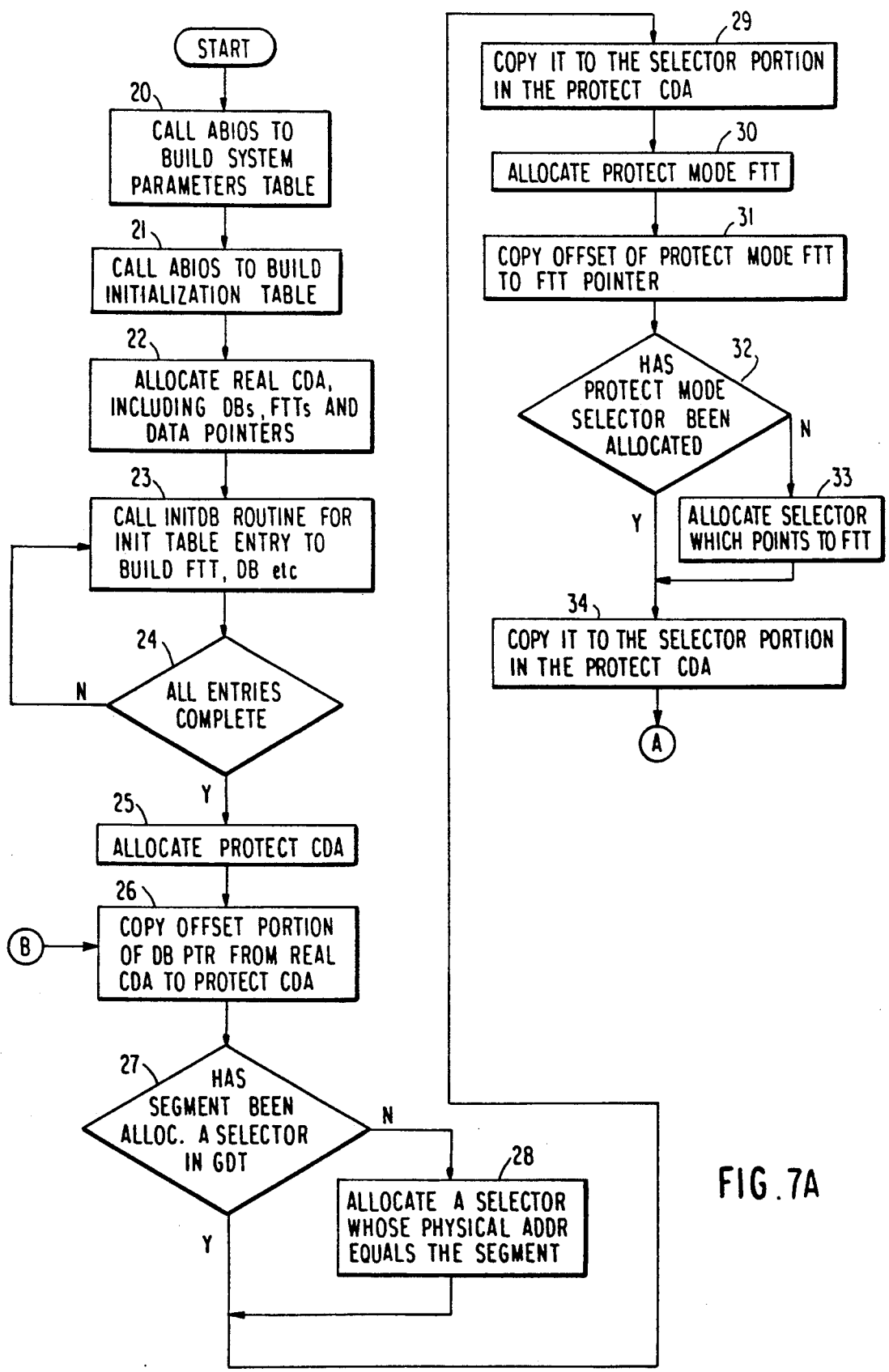
FIGS. 7a and 7b illustrate a flowchart showing in detail how the bimodal common data illustrated in FIG. 6 is assembled.
Figure 7B:
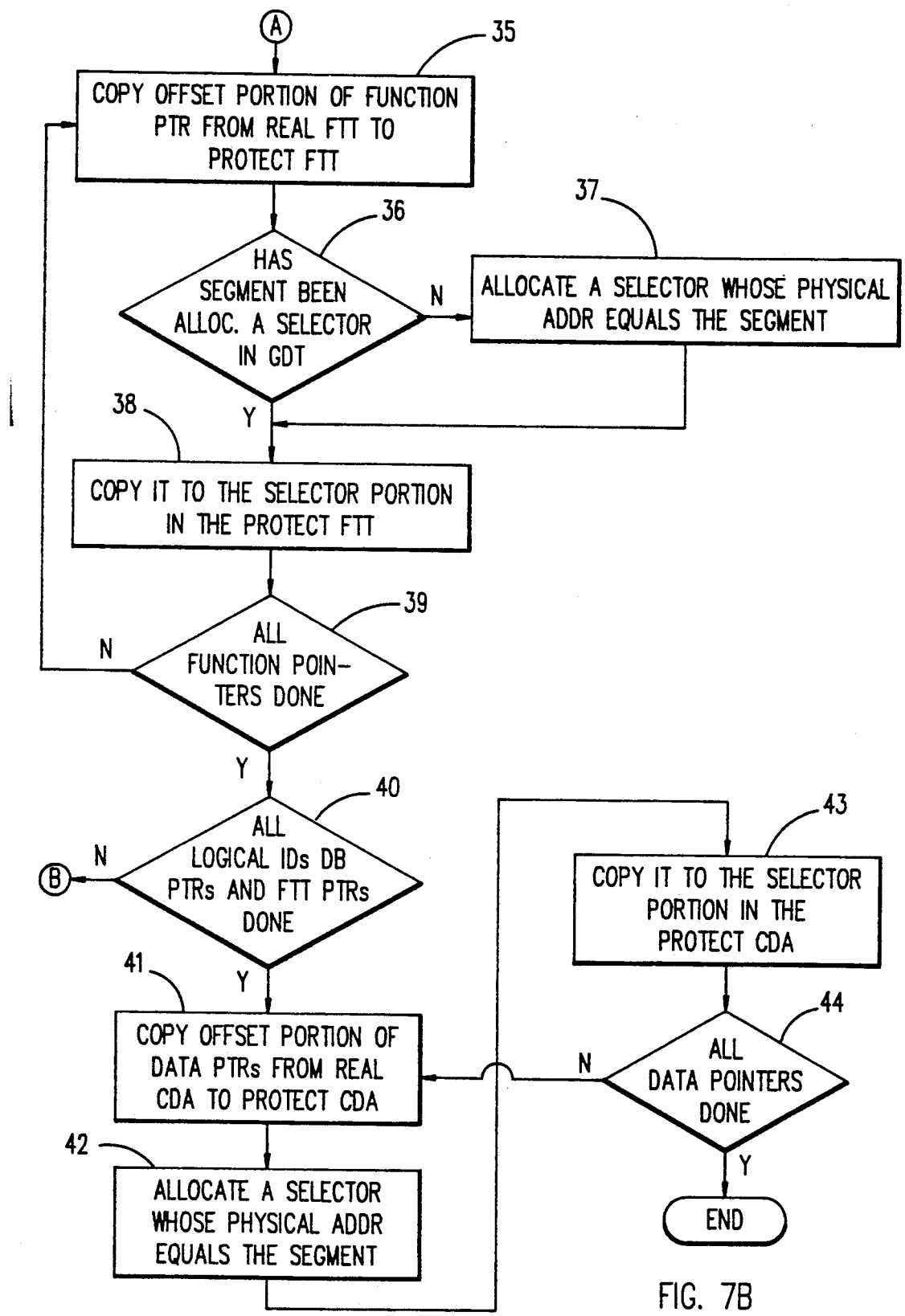

FIG. 7 is a flowchart describing in detail the manner in which the two CDAs are assembled. The operations to be described next are conducted during system initialization, generally after execution of the POST tests and with the system running in real mode.

From the START point, the ABIOS is called to build the systems parameters table in step 20. In step 21, ABIOS is called to build the initialization table. Next, in step 22, memory space is allocated for the real mode CDA, including the DBs, FTTs, and data pointers. In subsequent step 23 an initial DB (InitDB) routine is called for initial table entries to build the FTT, DB. etc. Those having familiarity with the BIOS used in the IBM AT computer will understand the further details of how steps 20 to 23 are implemented.

After it has been determined in step 24 that all entries in the real mode CDA table are complete, in step 25, memory space is allocated for the protected mode CDA. In following step 26, in accordance with an important aspect of the invention, an offset portion of a DB pointer in the real mode CDA copied directly to the corresponding entry in the protected mode CDA. For the offset value copied in step 26, in steps 27 and 28, a selector is allocated whose physical address is equal to the segment of the respective pointer in the real mode CDA. In step 29, the selector is copied to the corresponding position in the protected mode CDA to complete the pointer.

With reference to steps 30 to 34, an FTT pointer is assembled in a slightly different manner than the DB pointers in steps 26 to 29 since the FTT pointers point to other pointers within the CDA rather than addresses external to the CDA. In step 30, a protected mode FTT is allocated and, in step 31, a copy of the offset of the corresponding real mode FTT pointer is copied to the protected mode FTT pointer. In subsequent step 32, a determination is made as to whether the protected mode selector has been allocated. If not, in step 33, a selector is allocated which points to the FTT. In step 34, the selector is copied to the selector portion in the protected mode CDA.

Similar to the assembly of the DB pointer in steps 26 to 29, in steps 35 to 38, a corresponding function pointer is assembled in the protected mode CDA.

Step 39 tests to determine if all pointers of the FTT have been completed. Steps 35 to 39 are repeated until all pointers of the FTT have been assembled. Following step 40 tests to determine whether all logical IDs, DB pointers, and FTT pointers have been completed. If not, the process loops back to step 26, and steps 26 to 40 are repeated until all logical IDs. DB pointers, and FTT pointers have been completed.

To finish the protected mode CDA. in step 41, the data pointers (e.g., pointers to the video buffer) are assembled. This is done in the same fashion as above. In step 41 the offset portion of a data pointer from the real mode CDA is copied to the corresponding entry in the protected mode CDA. and in step 42, a selector is allocated having a physical address equal to the segment in the corresponding real mode CDA entry. The selector is copied into the protected mode CDA in step 43. In step 44, it is determined if all data pointers have been completed. If not, the process loops back to step 41, whereupon steps 41 to 44 are repeated until all data pointers have been finished. At that time, assembly of both CDAs is completed.

Figure 8:
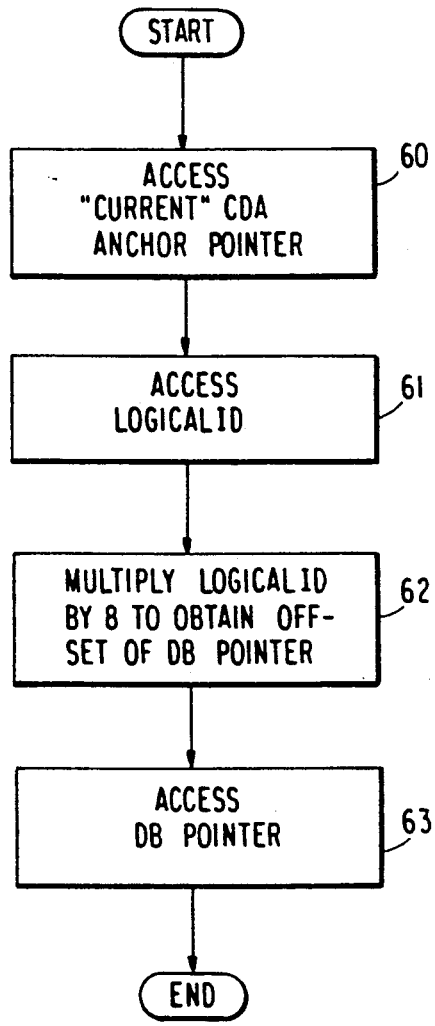
FIG. 8 is a flowchart showing an example of how a device block pointer is obtained for a given logical ID.

To show an example of how the assembled CDA is used by the ABIOS. FIG. 8 is a flowchart showing an example of how a DB pointer is obtained from the bimodal CDA for a given logical ID.

First, the "current" CDA anchor pointer and the corresponding logical ID are accessed in steps 60 and 61. In step 62, the logical ID is multiplied by $2^3 (=8)$ to obtain the offset for the DB pointer. Then, in step 63 the DB pointer can be accessed.

Figure 9:
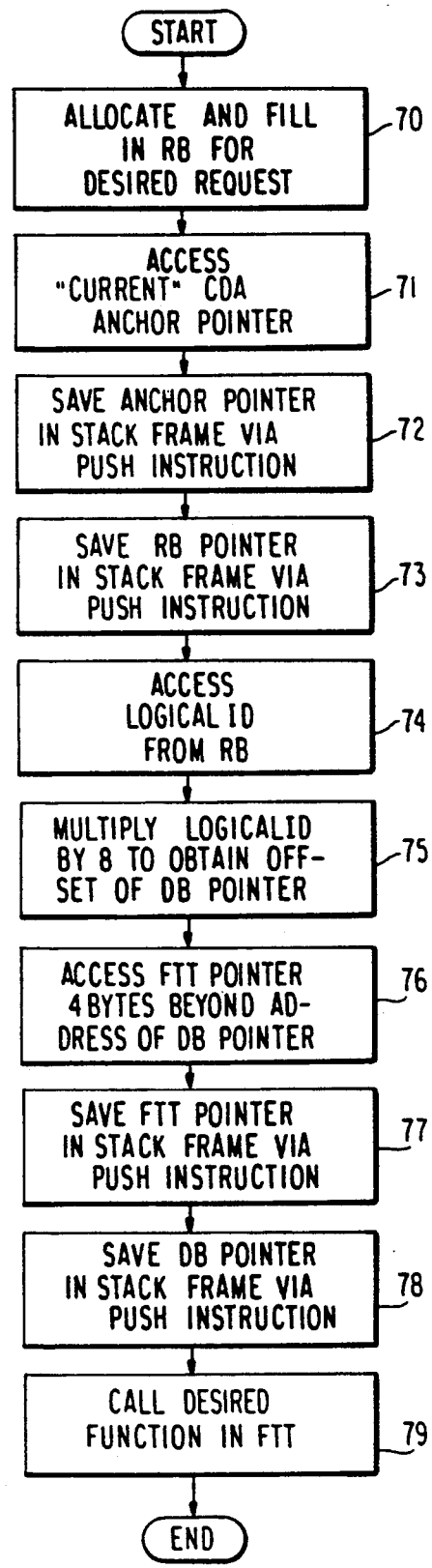
FIG. 9 is a flowchart illustrating how a request is made to the BIOS in the computer system of the invention.

FIG. 9 is a flowchart showing how a program makes a request to the ABIOS.

First, in step 70, a request block for the specific request at hand is allocated and filled in. In step 71, the "current" CDA anchor pointer is accessed. In subsequent steps 72 and 73, the anchor pointer and the RB pointer are saved in the stack frame using PUSH instructions. The appropriate logical ID from the RB is accessed in step 74. (There is of course a one-to-one correspondence between logical IDs and device entries in the CDA.) In step 75, the logical ID is multiplied by $2^3$ to obtain the offset of the DB pointer (four bytes/pointer, two pointers). The respective FTT pointer four bytes beyond the address of the DB pointer is accessed in step 76, and this FTT pointer is saved to the stack frame using a PUSH instruction in step 77. In step 78, the DB pointer is saved to the stack frame, also using a PUSH instruction. Finally, in step 79, the desired function is called in the FTT.

Further applications are also contemplated within the scope of the invention. For example. "patching" of the BIOS code to effect changes thereto can be achieved using the FTT pointers. That is. FTT pointers can be inserted in the CDAs which cause redirection to patch routines.

This completes the description of the preferred embodiment of the invention. It is to be understood though that while modifications can be made to the structure and teachings of the present invention as described above, such modifications fall within the spirit and scope of the present invention as specified in the claims appended hereto.

Having thus described our invention, what we claim as new, and desire to secure by Letters Patent, is:

1. An addressing arrangement for a computer system that includes an addressable memory having addresses within a predefined addressing range and a system processor capable of addressing said memory in two distinctly different addressing modes, including a first mode in which said system processor is capable of addressing only a discrete sub-portion of said predefined addressing range and a second mode in which said processor is capable of addressing all of said predefined addressing range, said addressing arrangement comprising:

means for assigning selected first and second storage spaces in said memory as respective first and second common data areas for storing pointers to be used by said system processor in association with said first and second modes, respectively;

means for assembling a plurality of pointers in said common data areas, each of said pointers in said first common data area having an equivalent pointer in said second common data area, each said equivalent pointer, when accessed by said system processor in said second mode, effectively pointing said processor to an address within said sub-portion of said addressing range which is the same as the address to which the processor would be pointed if it had accessed the respective equivalent pointer in said first common data area in the first mode; and means for locating said first and second common data areas comprising:

a first anchor pointer pointing to said first common data area such that when the system processor is in the first operating mode said processor forms addresses by first accessing the first common data area to retrieve a pointer that points to a predefined address in said sub-portion of said addressing range; and a second anchor pointer pointing to said second common data area such that when the system processor is in the second operating mode, the system processor addresses the second common data area to gain access to a pointer which, if equivalent to a pointer in said first common data area, effectively points to the same predefined address in said sub-portion of said addressing range as the equivalent pointer in said first common data area; whereby in response to a memory access request in either operating mode of the system processor, said assigning means steers the system processor to address the same location in memory without the system processor switching modes.

2. The computer system of claim 1, wherein said pointers in each of said first and second common data areas comprise device block pointers, function transfer table pointers, data pointers, and function pointers.

3. The computer system of claim 2, wherein at least one of said function transfer table pointers points to a patch routine for BIOS code.

4. A method for directing addressing of memory in a computer system having a system processing unit and a memory addressable by said processing unit, within a predefined addressing range, in first and second different, addressing modes, said first and second modes respectively characterized in that said processing unit can address only a discrete sub-portion of said predefined addressing range while operating in said first mode and said unit can address all of said predefined addressing range while operating in said second mode, said method comprising the steps of:

allocating spaces in said memory for use as first and second common data areas for respectively storing pointers to be used by said processing unit in association with addressing operations in said different first and second addressing modes, respectively;

providing first and second anchor pointers respectively pointing to said first and second common data areas, for use by said processing unit to gain access to said first and second common data areas when said processing unit is operating in said first and second addressing modes, respectively;

storing a first set of pointers in said first common data area for use by said processing unit in responding to data transfer requests presented to said processing unit when said processing unit is operating in said first addressing mode, said pointers of said first set effectively pointing said processing unit to construct respective addresses in said discrete sub-portion of said predefined addressing range; and storing in said second common data area a respective second set of pointers for use by said processing unit in responding to data transfer requests presented when said processing unit is operating in said second addressing mode, said pointers in said second set comprising a subset of pointers equivalent to those in said first set, each pointer in said subset effecting pointing said processing unit to an address in said discrete sub-portion of said addressing range which is the same as the address pointed to by the respectively equivalent pointer in said first set.

5. A method for directing addressing of memory by a system processing unit in accordance with claim 4, wherein step of storing said first set of pointers in said first common data area comprises assembling, as said pointers of said first set, device block pointers, function transfer table pointers, data pointers and function pointers.

6. A method for directing addressing of memory by a system processing unit in accordance with claim 5, wherein said memory contains BIOS code having a predetermined function and a patch routine for modifying an operation of said BIOS code relative to said predetermined function, and wherein at least one of said function transfer table pointers points to said patch routine.

7. A computer system including a memory having addresses within a predefined addressing range and a system processing unit operating to address said memory in first and second distinctly different addressing modes, said processing unit when operating in said first mode being capable of addressing only a discrete sub-portion of said predefined addressing range, said processing unit when operating in said second mode being capable of addressing all of said predefined addressing range, said system comprising:

a system processing unit operating in said first and second addressing modes; said processing unit operating in each said mode to form memory addresses, in response to various types of data transfer requests presented to said unit by programs executed in said system processing unit;

addressing means cooperating with said system processing unit for controlling operations performed by said system processing unit, in said first and second addressing modes, in response to said data transfer requests;

said addressing means comprising first and second sets of pointers stored in said memory for use by said system processing unit, respectively in said first and second modes, when responding to data transfer requests associated with individual pointers in respective first and second sets, each said set including pointers pointing to predetermined respective first and second regions of said memory, pointers in said first set pointing to information for computing addresses within said discrete sub-portion of said predefined addressing range, and pointers in said second set pointing to information for computing addresses anywhere in said predefined addressing range, wherein at least one of said pointers in said first set has a corresponding pointer in said second set that points to information for causing said processing unit to compute the same address in said second mode as it would compute in the first mode relative to the corresponding pointer in the first set, said addressing means further comprising first and second anchor pointers for respectively indicating locations of said first and second sets of pointers;

said first anchor pointer directing said system processing unit to said first set of pointers whenever said system processing unit is in the first addressing mode; and said second anchor pointer directing said system processing unit to the second set of pointers whenever said system processing unit is in the second addressing mode;

whereby said system processing unit may be directed to address the same location in said memory in either addressing mode without said system processing unit switching addressing modes.

8. The computer system of claim 7, wherein said predefined addressing range includes a portion addressable by said system processing unit in only said second addressing mode.

9. A computer system comprising:

an addressable memory, a system processing unit including a processor operable to compute addresses relative to said addressable memory in any one of a plurality of different addressing modes characterized by formation of addresses associated with respectively different addressing ranges such that addresses formed in one of said different addressing modes may lie in a first predefined range, and addresses formed in another of said different addressing modes may lie both within and outside of said predefined range;

first means for storing a first set of pointers, each pointer therein pointing said processing unit to information in said addressable memory from which said processing unit can form addresses in a first set of addresses while operating in a first one of said addressing modes;

second means for storing a second set of pointers, each pointer therein pointing said processing unit to information in said addressable memory from which said system processing unit can form addresses in a second set of addresses while operating in a second one of said addressing modes, said second set of addresses including addresses in said first set and addresses not in said first set;

first means for directing said system processing unit to a pointer in said first set whenever said system processing unit is responding to a programmed request for data transfer while operating in the first addressing mode; and second means for directing said system processing unit to a pointer in said second set whenever said system processing unit is responding to a programmed request for data transfer while operating in the second addressing mode;

wherein a value of a pointer within said first set, associated with a predetermined type of data transfer request, and a value of an associated pointer within said second set associated with the same type of request effectively point said processing unit to form the same address in said addressable memory, whereby data transfer requests of the same type are processed transparently by said processing unit in said first and second addressing modes.

10. The computer system of claim 9, wherein said first directing means comprises a first anchor pointer directing the system processing unit into said first set.

11. The computer system of claim 10, wherein said second directing means comprises a second anchor pointer directing the system processing unit into said second set.

12. A dual mode addressing arrangement, for use in a computer system having an addressable memory and a processing unit operable to address that memory in first and second different addressing modes, said addressing arrangement comprising:

first means for constructing a first table of pointers configured to be used by said processing unit in said first addressing mode, and when so used to steer said processing unit to address predetermined first physical locations in said memory;

second means for constructing a second table of pointers, configured to be used by said processing unit in said second addressing mode, and when so used to steer said processing unit to address predetermined second physical locations in said memory;

said pointers in said second table including a set of pointers corresponding to the pointers in said first table;

each said pointer in said first table and corresponding pointer in said second table being configured to effectively steer said processing unit to address the same physical location in said memory when operated respectively in said first and second addressing modes; whereby said processing unit can be referred to identical physical locations in said memory while operating in either said first or second modes without having to switch modes.

13. A dual mode addressing arrangement in accordance with claim 12 including:

means for causing said first and second pointer tables to be stored in respective first and second selected storage spaces in said memory; and means for constructing first and second anchor pointers, for respectively locating said first and second selected storage spaces.

14. An addressing arrangement in accordance with claim 13 comprising:

means for activating said means for constructing said first and second tables and said anchor pointers; whereby said first and second tables are constructed and stored respectively in said first and second selected memory spaces, and said first and second anchor pointers are constructed to effectively locate said first and second spaces.

15. An addressing arrangement in accordance with claim 14 wherein:

said first and second addressing modes of said processing unit are real and protected modes respectively; said real and protected modes being arranged so that:
said processing unit can address a predetermined range of addresses while operating in said protected mode and only a proper subset of said predetermined range of addresses while operating in said real mode; and wherein
said corresponding pointers in said first and second tables are configured to enable said processing unit to address identical locations in said memory, within said proper subset of said predetermined range of addresses, without having to switch between said real and protected modes.

16. A method of providing a dual mode addressing arrangement, for a computer system having an addressable memory and a processing unit operable to address that memory in first and second distinctly different addressing modes, said method comprising the steps of:
constructing first and second tables of pointers for use by said processing unit respectively in said first and second addressing modes;
using pointers in said first table for steering said processing unit to address associated first physical locations in said memory when said processing unit is operated in said first mode;
using pointers in said second table for steering said processing unit to address associated second physical locations in said memory when said unit is operated in said second mode;
each pointer in said first table having a corresponding pointer in said second table; each pointer in said first table and corresponding pointer in said second table being arranged to steer said processing unit to address the same physical location in memory when said unit is operated respectively in said first and second modes; whereby said processing unit can be directed to address identical physical locations in said memory while operating in either of said first and second modes without having to switch modes.

17. A method of providing a dual mode addressing arrangement in accordance with claim 16 including the steps of:
storing said first and second tables respectively in selected first and second storage spaces in said memory; and
constructing first and second anchor pointers designating respective locations of said first and second storage spaces; said first and second anchor pointers serving to enable said processing unit to locate said first and second tables, when said unit is operating respectively in said first and second addressing modes.

18. A method of constructing a dual mode addressing arrangement in accordance with claim 17 wherein said first and second modes are real and protected modes respectively; said real and protected modes being characterized in that:
said processing unit can address a predetermined range of addresses while operating in said protected mode and only a proper subset of said predetermined range while operating in said real mode; and wherein
each pointer in said first table and corresponding pointer in said second table are configured to cause said processing unit to address the same location in said memory, within said proper subset of said addressing range, without having to switch between said real and protected modes.

* * * * *